March 1, 1938. H. J. RAPUANO 2,109,550
SWITCH OPERATING DEVICE FOR STEERING WHEELS
Filed June 1, 1937
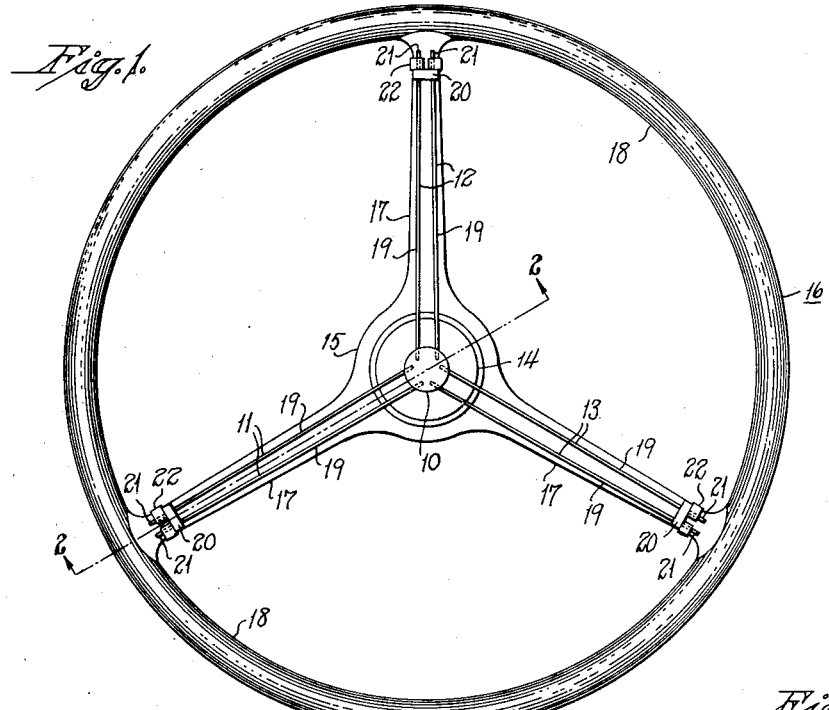
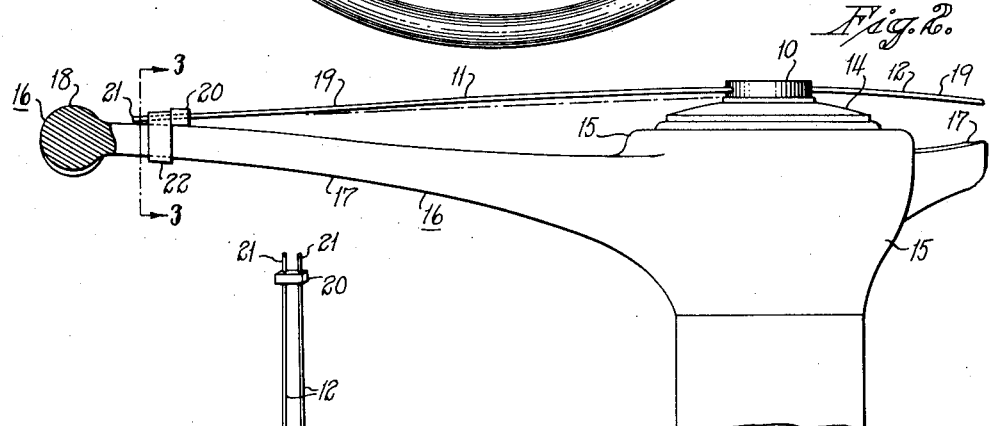
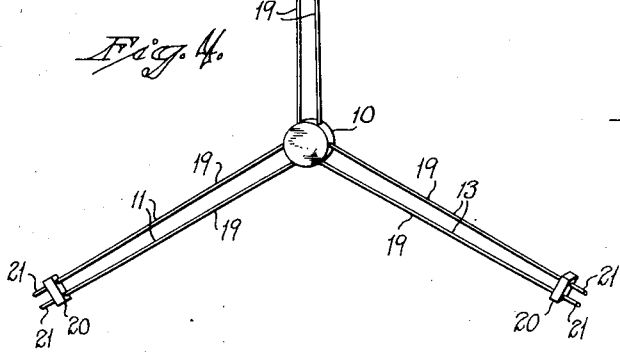
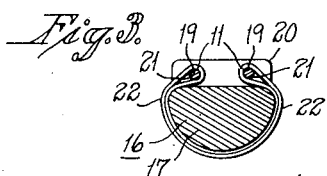
Inventor
Henry J. Rapuano
By Seymour Earle & Nichols
Attorneys Patented Mar. 1, 1938

2,109,550

UNITED STATES PATENT OFFICE 2,109,550

SWITCH-OPERATING DEVICE FOR STEERING-WHEELS

Henry J. Rapuano, New Haven, Conn.

Application June 1, 1937, Serial No. 145,646

3 Claims. (Cl. 74—484)

This invention relates to switch-operating devices and particularly to switch-operating devices suitable for mounting upon steering-wheels of automobiles and particularly suited for operating the horn-button or horn-switch thereon.

One of the objects of the present invention is to provide a superior device of the character described which may be produced at a low cost for manufacture.

A further object is to provide a superior switch-operating device for steering-wheels which may be readily and conveniently installed upon the latter.

Another object is to provide a superior device of the character referred to which when mounted upon the steering-wheel will not rattle thereon or otherwise create objectionable noise.

A still further object is to provide a switch-operating device which may be conveniently installed upon a steering-wheel without marring the surface thereof.

With the above and other objects in view, as will appear to those skilled in the art from the present disclosure, this invention includes all features in the said disclosure which are novel over the prior art.

In the accompanying drawing:

Fig. 1 is a top or plan view of one form which a switch-operating device may assume in accordance with the present invention and shown as installed upon a steering-wheel;

Fig. 2 is a broken sectional view taken on the line 2—2 of Fig. 1;

Fig. 3 is a transverse sectional view taken on the line 3—3 of Fig. 2; and

Fig. 4 is a perspective view of the switch-operating device detached.

The particular switch-operating device herein chosen for the illustration of the present invention includes a disk-like centrally-arranged head or coupling 10 and three (more or less) flexible radial arms 11, 12 and 13. The said head 10 is adapted to be positioned directly over the horn-button 14 which latter is mounted in the usual manner of automobile steering apparatus in the center of the hub 15 of a steering-wheel generally designated by the reference character 16. The said steering-wheel includes radial spokes 17 extending between the hub 15 and an annular rim 18 and one of which spokes underlies each of the radial arms 11, 12 and 13 of the switch-operating device, as clearly shown in Fig. 1.

The radial arms 11, 12 and 13 above referred to are equidistantly spaced from each other and each thereof includes two substantially-parallel wire-like members 19—19 having their inner ends seated in sockets in the head 10 to which they may be secured by soldering or in any other suitable manner. As the wire-like members 19—19 of each of the radial arms extend outwardly they converge slightly and extend through a tie-block or tie-piece 20 secured in place by staking or in any other suitable manner, closely adjacent the outer end of a given arm but sufficiently inwardly to permit the wire-like members 19—19 to extend outwardly beyond the said tie-block to provide a pair of spaced-apart coupling-fingers 21—21.

Looped over each of the coupling-fingers 21—21 respectively of a given one of the arms 11, 12 or 13, is one end of an elastic strap 22 which in the instance shown is of rubber or other equivalent elastic material and which extends down and around the adjacent portion of the spoke 17, as particularly well shown in Fig. 3. The tension of the elastic straps 22 serves to maintain each of the tie-blocks 20 in engagement with the upper surface of the spokes 17 so that not only is the wheel surface not marred but no objectionable rattling takes place between the device and the steering-wheel as an incident to shocks occasioned by rough roads, etc.

The horn-button 14 may be depressed for sounding the horn by pressing downwardly directly on the head 10 to depress the said button in the usual manner or the said horn-button may be depressed by pressing downwardly upon any one of the radial arms 11, 12 or 13 (as per broken lines in Fig. 2) to correspondingly depress the head 10 and hence the horn-button. The horn-button 14 may also be operated by grasping any given one of the arms 11, 12 or 13 together with the underlying spoke 17 and jointly squeezing the two said elements.

The invention may be carried out in other specific ways than that herein set forth without departing from the spirit and essential characteristics of the invention, and the present embodiment is, therefore, to be considered in all respects as illustrative and not restrictive, and all changes coming within the meaning and equivalency range of the appended claims are intended to be embraced therein.

I claim:

1. A switch-operating device for steering-wheels comprising: a central head-member; a plurality of flexible arms radiating from the said head-member and each free to be flexed in the plane of the device to enable it to be brought into alignment with a given one of the spokes of a steering-wheel and each having a pair of spaced-apart coupling-fingers; and a flexible and elastic strap-member engaged at each of its respective opposite ends with one of the coupling-fingers of a given pair thereof and extendible around the adjacent spoke of a steering-wheel to elastically couple the device thereto.

2. A switch-operating device for steering-wheels comprising: a central head-member; a plurality of arms radiating from the said head-member and each including a pair of spaced-apart bars; and a flexible and elastic strap-member engaged at each of its respective opposite ends with one of the two said bars of a given arm and extendible around the adjacent spoke of a steering-wheel to elastically couple the device thereto.

3. A switch-operating device for steering-wheels comprising: a central head-member; a plurality of arms radiating from the said head-member and each including a pair of spaced-apart bars; a tie-block mounted upon each of the said arms slightly inwardly from the outer end thereof and serving to hold the spaced-apart bars thereof in spaced relationship; and a flexible and elastic strap-member engaged at each of its respective opposite ends with that portion of one of the bars of a given arm which extends beyond the said tie-block and extendible around the adjacent spoke of a steering-wheel to elastically couple the device thereto.

HENRY J. RAPUANO.